United States Patent [19]
Sharp

[11] 3,710,186
[45] Jan. 9, 1973

[54] SIGNAL PROCESSING CIRCUIT
[75] Inventor: Denis Sharp, East Grinstead, England
[73] Assignee: U.S. Philips Corporation, New York, N.Y.
[22] Filed: Dec. 12, 1969
[21] Appl. No.: 884,551

[30] Foreign Application Priority Data

Dec. 13, 1968 Great Britain............59,525/68

[52] U.S. Cl................317/5, 188/181 A, 303/20, 303/21 BE, 324/162, 340/262
[51] Int. Cl..............................H02p 5/00, B60t 8/12
[58] Field of Search ...188/181; 303/20, 21; 307/121; 324/162; 340/52 R, 262; 317/5

[56] References Cited

UNITED STATES PATENTS

| | | | |
|---|---|---|---|
| 3,245,727 | 4/1966 | Anderson et al. | 303/21 EB |
| 3,482,887 | 12/1969 | Sheppard | 303/21 BE |
| 3,584,921 | 6/1971 | Crawford | 303/21 BE |
| 3,614,174 | 10/1971 | Romero | 303/21 CG |
| 3,398,995 | 8/1968 | Martin | 303/21 BE |
| 3,540,779 | 11/1970 | Marouby | 303/21 BE |
| 3,524,685 | 8/1970 | Harned et al. | 303/21 BE |
| 3,494,671 | 2/1970 | Slavin et al. | 303/21 P |
| 3,532,393 | 10/1970 | Riordan | 303/21 BE |
| 3,017,145 | 1/1962 | Yarber | 303/21 P |
| 3,556,610 | 1/1971 | Leiber | 303/21 P |

*Primary Examiner*—Milton Buchler
*Assistant Examiner*—Stephen G. Kunin
*Attorney*—Frank R. Trifari

[57] ABSTRACT

A vehicle anti-lock brake control system includes a pick-up device that produces electric signals with a frequency proportional to the vehicle wheel speed. These signals are applied via an amplifier to a Frequency-D.C. converter that develops a voltage proportional to wheel speed. A signal processing circuit is responsive to this voltage to produce an output signal when the wheel deceleration rate exceeds a reference deceleration. The output of the signal processing circuit is applied via a power amplifier to energize a solenoid that initiates an anti-lock braking action. The signal processing circuit will subsequently deenergize the solenoid as a function of a given criterion related to the wheel movement, as determined by the voltage applied thereto from the converter. Possible criteria are that the reference deceleration is no longer exceeded, that the wheel has ceased to decelerate or has started to accelerate.

12 Claims, 15 Drawing Figures

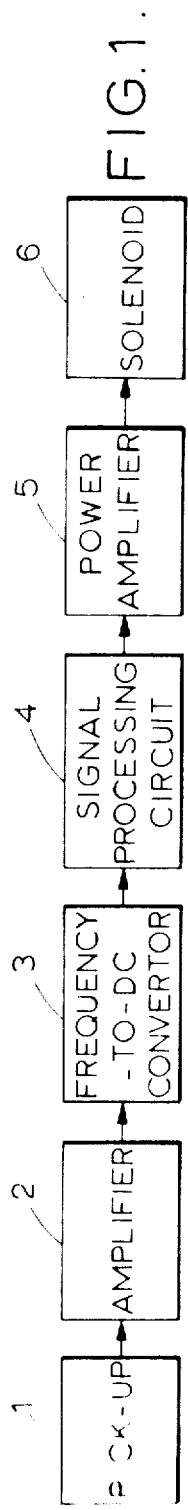
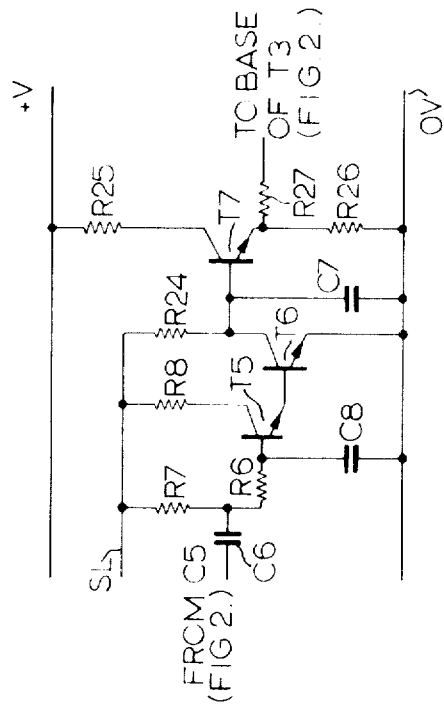
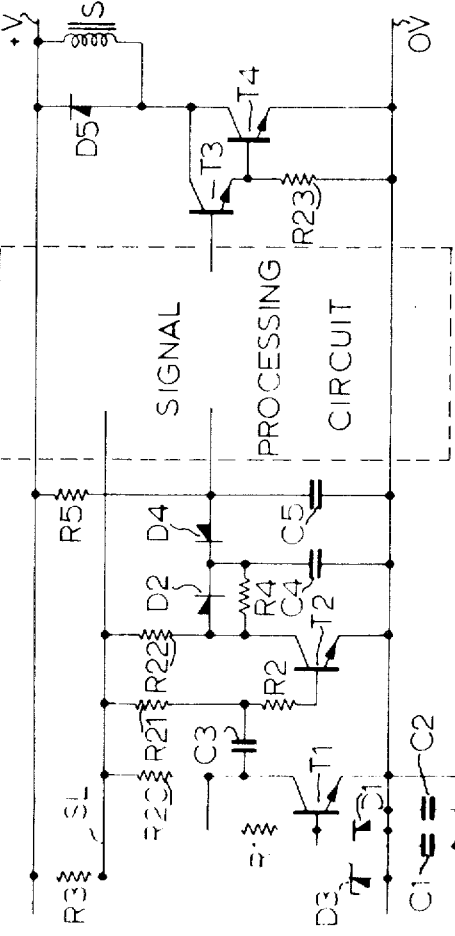

INVENTOR.
DENIS SHARP

INVENTOR.
DENIS SHARP
BY
AGENT

INVENTOR.
DENIS SHARP
BY
AGENT

SIGNAL PROCESSING CIRCUIT

This invention relates to anti-lock brake systems for wheeled vehicles, that is, to systems designed to improve the braking performance by relieving the braking pressure applied to a wheel if the wheel tends to lock on a slippery surface following a braking action by a driver and then increasing the braking pressure again without the need for any change in the action of the driver. Such systems can be successful in reducing the risk of skidding due to wheel lock and in maintaining directional control during braking, and can also reduce braking distances.

Anti-lock brake systems can be hydraulic or air operated systems for application to different kinds of vehicle. Hydraulic brake systems can be of the master cylinder type with or without vacuum or air pressure servo amplifiers, or of the continuously pumped type. Air and air/hydraulic brake systems are usually of the continuously pumped type.

Although the relieving of braking pressure applied to a wheel can be effected in a variety of ways depending on the type of anti-lock brake system, it may be said to be always initiated by what will be hereinafter termed an "anti-lock action" which is effected in anti-lock brake systems when the wheel tends towards a locked condition that could result in skidding. In order to effect such anti-lock action an anti-lock brake system may include a wheel movement sensor for producing signals related to wheel rotational movement and anti-lock means operable in response to said signals in dependence on a particular criterion to produce mechanical movement for causing the anti-lock action. One such criterion is for the anti-lock means to be rendered operable when the deceleration of the wheel exceeds a predetermined value.

The mechanical movement may be utilized in various ways for causing the anti-lock action, depending upon the type of anti-lock brake system concerned. For example, in the case of a continuously pumped hydraulic brake system in which fluid, pumped continuously to supply circulation of fluid under pressure, is fed to a wheel brake to an extent determined by operation of a brake pedal by a driver, the anti-lock action caused by said mechanical movement may be the actuation of an anti-lock control valve connected to or in a pressure line feeding the brake to divert some of the fluid from the brake to relieve the braking pressure. This may be considered as a direct anti-lock action to relieve braking pressure because the control valve acts directly on the actual fluid that is producing the braking pressure. Similarly, in the case of a master cylinder type hydraulic brake system in which fluid in a hydraulic pressure line from a master cylinder to a wheel brake is pressurized by actuation of the master cylinder piston consequent upon operation of a brake pedal by a driver, the anti-lock action caused by said mechanical movement may be the actuation of an anti-lock control valve connected to or in the hydraulic pressure line to divert fluid from the brake to relieve the braking pressure, so that again the actual fluid producing the braking pressure is acted on directly.

On the other hand, it is possible to have an indirect anti-lock action to relieve braking pressure. For instance, in the second example given above, the control valve in the hydraulic pressure line may itself be fluid pressure actuated to relieve braking pressure - instead of being actuated directly by said mechanical movement-by an ancillary fluid pressure system which includes in a pressure line to the control valve a second control valve which is actuated by said mechanical movement to apply fluid pressure to the existing control valve for its actuation. Also, in this instance, there may be provided in the ancillary fluid pressure system a further control valve which is arranged to be actuated directly by an ancillary anti-lock action which is caused by mechanical movement produced by operation of further anti-lock means operable when deceleration of an appertaining wheel exceeds a predetermined value. This further control valve permits, when actuated by this ancillary anti-lock action, the fluid relieved by said second control valve to be exhausted from the ancillary fluid pressure system.

In designing different types of anti-lock brake systems, it has been found to be important, in attempting to obtain improved performance of such systems, to be able to control the instant when braking pressure is to be increased again following an anti-lock action, as well to control as the instant when braking pressure is to be relieved by an anti-lock action.

According to the present invention there is provided, for use in an anti-lock vehicle brake system, anti-lock means operable in response to wheel rotational movement to initiate an anti-lock action in the system dependent upon a first criterion related to such movement, said anti-lock means being subsequently responsive in dependence on a second criterion related to wheel rotational movement to terminate said anti-lock action.

In carrying out the invention, said first criterion may be the instant at which the deceleration of a wheel exceeds a predetermined value, for example, a deceleration of 1g ordinarily greater, (e.g.1.2g).

With regard to the second criterion, it has been found that the selection of same is governed to a major extent by the type of anti-lock brake system concerned.

Thus, said second criterion may be any one of the following:

1. When a wheel attains the speed it would have been doing if it had continued to decelerate at said predetermined value from the speed it was doing when the anti-lock means was rendered operable. 2. When a wheel attains maximum acceleration following initiation of an anti-lock action, this criterion being synonymous with the wheel attaining the point of maximum adhesion.

3. When wheel deceleration no longer exceeds said predetermined value.

4. When a wheel starts to accelerate or exceeds a predetermined acceleration following initiation of an anti-lock action.

5. When wheel deceleration no longer exceeds a further predetermined value or the wheel has ceased to decelerate following initiation of an anti-lock action.

With regard to each of the second criteria (3), (4) and (5) set forth above, the anti-lock means may be arranged such that it remains unresponsive when the particular second criterion obtains until a selected one of the following subsidiary criteria also obtains:

a. the wheel speed is not below a fixed reference speed.

b. the wheel speed is not below a fixed reference speed and also not below the speed the wheel would have been doing if it had continued to decelerate at said predetermined value from the speed it had achieved when the anti-lock means was rendered operable.

c. the wheel speed is not below a chosen fraction of the speed the wheel would have been doing if it had continued to decelerate at said predetermined value from the speed it was doing when the anti-lock means was rendered operable.

d. the wheel speed is not a fixed amount below the speed the wheel would have been doing if it had continued to decelerate at said predetermined value from the speed it was doing when the anti-lock means was rendered operable.

In preferred embodiments of the invention said anti-lock means is an electrical circuit arrangement (hereinafter referred to as an anti-lock circuit arrangement) comprising a wheel speed sensor for producing electrical signals related to wheel rotational speed, an electro-magnetic device which is operable to produce mechanical movement for causing an anti-lock action, a conversion circuit responsive to said electrical signals to produce an electrical output which is a function of wheel rotational speed, and a signal processing circuit which is responsive to said electrical output in dependence on said first criterion to cause operation of said device, said signal processing circuit being further responsive to said electrical output in dependence on one of said second criteria, with or without its response being subject to a selected one of said subsidiary criteria, to cause subsequent release of said device.

The invention further provides different forms of signal processing circuits per se which are adapted for response in accordance with the first and/or any one of the second criteria specified above, with or without the response in respect of the second criteria being subject to a selected one of said subsidiary criteria.

A signal processing circuit according to the invention can be arranged to differentiate said electrical output from said conversion circuit to produce a signal waveform which is a function of wheel deceleration. The signal processing circuit is responsive to this signal to cause operation of said device when the instantaneous value of the signal waveform exceeds a reference value that is indicative of a predetermined value of wheel deceleration which is determined by certain of the circuit parameters. Also, the signal processing circuit may be arranged so as not to be responsive to said instantaneous value of the signal waveform unless such value persists for longer than a predetermined period or varies in a sense denoting increasing deceleration over such period. The circuit then provides what may be termed a "back-lash" feature which prevents spurious response of the circuit due to momentary decreases of wheel speed that may be produced by "whipping" in a vehicle suspension.

In further considering the mature of the invention reference will now be made by way of example to the accompanying drawings in which:

FIG. 1 is a block schematic diagram of an anti-lock circuit arrangement;

FIG. 2 shows a circuit diagram for the anti-lock circuit arrangement shown in FIG. 1, but with the signal processing circuit thereof retained in block schematic form;

FIGS. 3 to 6 show respective embodiments of signal processing circuits;

Figure 11A:
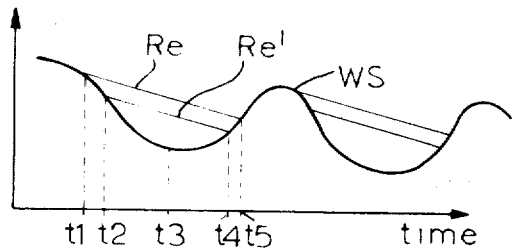
Figure 11B:
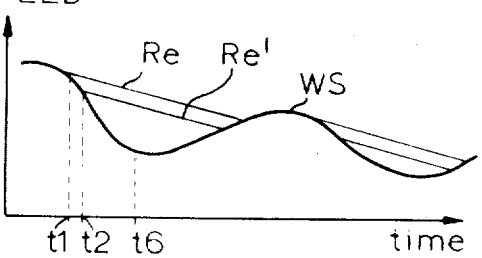
Figure 11C:
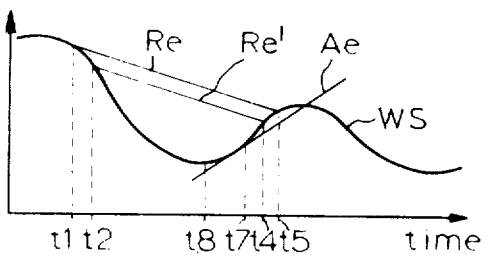
Figure 11D:
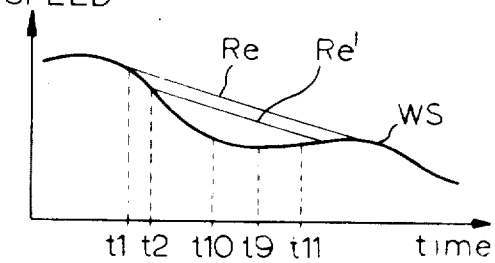
Figure 12:
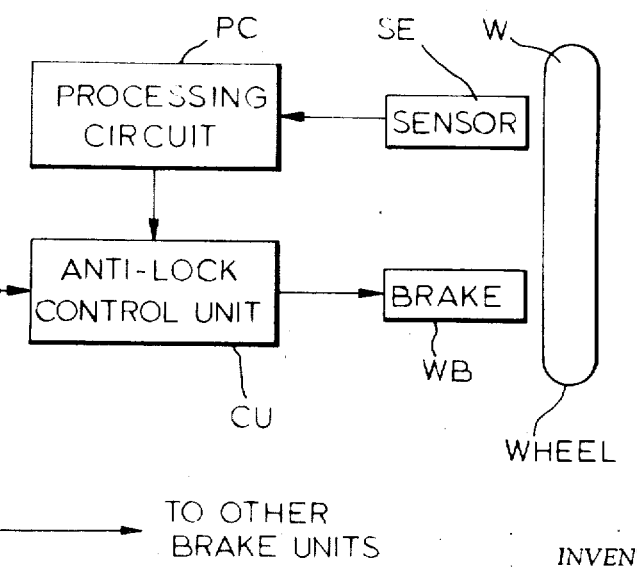

FIGS. 11 11(a) – 11(d) show waveform diagrams which are illustrative of the operation of the signal processing circuits of FIGS. 3 to 6; and FIG. 12 shows diagrammatically a general lay-out for an anti-lock brake system.

Referring to the drawings, the anti-lock circuit arrangement represented by the block diagram shown in FIG. 1 comprises a pick-up device 1 for producing a train of electrical pulses related to wheel speed. The pick-up 1 is suitably an electromagnetic pick-up positioned adjacent to a ferromagnetic toothed ring attached to a revolving vehicle wheel to sense a change of flux as each tooth of the ring passes it and is succeeded by a gap. Alternatively, the pick-up may be positioned adjacent to a ferromagnetic toothed ring attached to the propeller shaft of a vehicle and associated with the two (rear) wheels driven thereby for producing the train of electrical pulses related to wheel speed.

The pulse output from the pick-up 1 is amplified by an amplifier 2 and then applied to a frequency-to-D.C. converter 3. The latter is effective to produce an output voltage whose value is related to the frequency of the pulse output supplied by the pick-up 1 and thus may be termed a speed signal voltage as it is directly related to wheel speed. This speed signal voltage is applied to a signal processing circuit 4 which is responsive thereto to produce an output when it determines in accordance with the changing value of the speed signal voltage that the deceleration of the wheel has exceeded a predetermined value (i.e. a first criterion related to wheel rotational movement). This output from the signal processing circuit 4 is amplified by a power amplifier 5, the output from which operates an electromagnetic device 6, suitably a solenoid, adapted to produce mechanical movement for causing an anti-lock action in an anti-lock brake system in which the arrangement is incorporated. The time at which the electromagnetic device is subsequently released (to terminate the anti-lock action) is dependent on a second criterion also related to wheel rotational movement, as explained previously.

In the circuit diagram shown in FIG. 2 of the anti-lock circuit arrangement, the pick-up is represented only by an output coil L. The pulse output from this pick-up output coil L is coupled into the base of a transistor T1 via a capacitor C1, this transistor T1 comprising the amplifier 2 in FIG. 1. A capacitor C2 serves to remove unwanted interference signals present in the pulse output from the output coil L. A diode D1 serves to prevent the d.c. bias at the base of transistor T1, as provided by a resistor R1 connected between the base and collector of this transistor, from shifting due to the rectification of the pulse input signal to the base caused by the base/emitter diode of the transistor T1.

The output produced at the collector of transistor T1 is a square wave voltage which is coupled into the base of the transistor T2 via a capacitor C3. This capacitor C3 and a base resistor R2 for the transistor T2 have values chosen such that the transistor T2, which is normally conductive, is cut off to produce a positive pulse of fixed length at its collector for each cycle of square wave voltage coupled into its base. Each such positive pulse charges up a capacitor C4 through a diode D2 to a stabilized voltage on a line SL. The stabilized voltage is provided by a Zener diode D3 which is connected in series with a resistor R3 across voltage supply lines +V and 0V. At the termination of each positive pulse at the collector of transistor T2, capacitor C4 commences to discharge exponentially through a resistor R4 and the transistor T2. When the voltage across the capacitor C4 becomes negative with respect to the voltage across a capacitor C5, a diode D4 becomes forward biased so that capacitor C5 also commences to discharge through the diode D4, but at a much lower rate because its discharge time constant is much longer than the discharge time constant of capacitor C4. However, each time capacitor C4 is being re-charged, diode D4 is back based, thus allowing capacitor C5 to charge up via a resistor R5 with which it is connected in series across the voltage supply lines + V and 0V. As a result, there is produced across capacitor C5 an output voltage whose value is related to the frequency of the pulse input supplied by the pick-up and may thus be termed a speed signal voltage as it is directly related to wheel speed. The components T2, D2, D4, C4, R4 and R5 form the frequency-to-D.C. converter of the anti-lock circuit arrangement.

The signal processing circuit 4 to which this speed signal voltage is applied can be any of the circuits shown in FIGS. 3 to 6, which will be considered in detail next. The output from the signal processing circuit is applied to the base of a transistor T3 which is rendered conductive in response to this output, and the consequent positive-going voltage at the emitter of this transistor is applied to the base of a further transistor T4 to render this transistor conductive as well. These two transistors T3 and T4 form the power amplifier 5 of the arrangement shown in FIG. 1. The output from the transistor T4 energizes a solenoid S which forms the electromagnetic device 6 of the arrangement of FIG. 1. A diode D5 serves to clip the over-shoot voltage on the solenoid S when it is subsequently de-energized, thereby preventing excessively high voltages from being applied to the collector of transistor T4.

Consider now the signal processing circuits shown in FIGS. 3 to 6. The signal processing circuit of FIG. 3 is arranged to produce its output when the deceleration of the wheel, as determined by the circuit in accordance with the changing value of the speed signal voltage applied to it from the frequency-to-DC convertor, exceeds a predetermined value. This circuit terminates its output when the speed signal voltage applied to it assumes a value signifying that the wheel has reached the speed it would have been doing if it had continued to decelerate at said predetermined value from the speed it was doing when the circuit was rendered responsive.

The speed signal voltage produced across capacitor C5 (FIG. 2) is coupled into the base of a normally conductive transistor T5 via a capacitor C6 and a resistor R6. The value of this capacitor C6 and the value of a resistor R7, which is connected in series with resistor R6 between the base of transistor R5 and the stabilized voltage line SL, are chosen to provide a predetermined value of wheel deceleration (for example 1g). When the rate of change of the voltage across capacitor C5 assumes a value signifying that this predetermined value of wheel deceleration has been exceeded, transistor T5 and a further normally conductive transistor T6 are turned off. The circuit operation to achieve this is that the transistor T5 is normally conductive due to current flow into its base via resistors R6 and R7 from the stabilized voltage line SL. However, as the value of the output voltage across capacitor C5 decreases due to an increase in wheel deceleration, the voltage at the input side of capacitor C6 decreases correspondingly to cause some of the current through the resistor R7 to be diverted from the base of transistor T5 to the output side of capacitor C6. When the predetermined value of wheel deceleration has been exceeded, so much of the current has been diverted from the base of transistor T5 that this transistor and transistor T6 are rendered non-conductive to cause a normally non-conductive transistor T7 to become conductive. The current through resistors R6 and R7 is normally about ten times the current needed to maintain the two transistors T5 and T6 conductive so that the predetermined value of wheel deceleration at which transistor T7 becomes conductive is virtually independent of the gain of the transistors T5 and T6. A resistor R8 in the collector circuit of transistor T5 serves to limit the base current of transistor T6. A capacitor C7 connected between the collector of transistor T6 and the voltage supply line 0V serves to prevent spurious oscillation of the circuit at high frequencies.

A capacitor C8 in the base circuit of transistor T5 makes the circuit less sensitive to ripple in the output voltage across capacitor C5 (FIG. 2). The resistor R6 provides the "back-lash" feature previously mentioned whereby the wheel is required to decrease its speed by more than a fixed amount at a rate in excess of said predetermined value of wheel deceleration before transistors T5 and T6 are rendered non-conductive. To achieve this the value of the resistor R6 is chosen so that the voltage drop across it due to current flow into the base of transistor T5 determines said fixed amount of decrease in wheel speed. Thus, it is not until the current through resistor R6 has been reduced sufficiently to remove the voltage drop across it that transistor T5 (and transistor T6) will be cut off.

The output from the signal processing circuit of FIG. 3 is applied from the emitter of transistor T7 to the base of transistor T3 (FIG. 2) in the power amplifier of the anti-lock circuit arrangement. This output is terminated when transistor T7 subsequently is cut off again when the voltage at the input side of capacitor C6 next assumes the value indicative of said predetermined value of wheel deceleration, but also taking into account the voltage drop across resistor R6 (back-lash feature). This means, in effect, that the output is terminated when the wheel reaches the speed it would have been doing if it had continued to decelerate at said predetermined value from the speed it was doing when the signal processing circuit was rendered responsive.

The wave-form diagram in FIG. 11(a) is illustrative of the operation of the signal processing circuit of FIG. 3. In this diagram the curve WS represents wheel speed against time and the slope of the lines Re and Re' represents said predetermined value of wheel deceleration. In the absence of the "back-lash" feature as provided by resistor R6, when said value is exceeded at time t1 the circuit is responsive to produce an output to effect operation of solenoid 6 (FIG. 1). The ensuing anti-lock action, as discussed previously, brings about the relief of braking pressure applied to the wheel so that wheel deceleration ends at a time $t3$, after which the wheel starts to accelerate. When, at a time $t5$, the wheel reaches the speed it would have been doing if it had continued to decelerate at said predetermined value, as given by the slope of line $Re$, the circuit terminates its output in response to the value of speed signal voltage which then obtains at the input side of capacitor C6. The period $t1$ to $t5$ constitutes an anti-lock period during which the solenoid is energized. When the resistor R6 is included in the circuit, the solenoid is not energized until a time $t2$ after said predetermined value of wheel deceleration has been exceeded at time $t1$, and is subsequently de-energized at a time $t4$ so that the anti-lock period is shorter.

Figure 4:
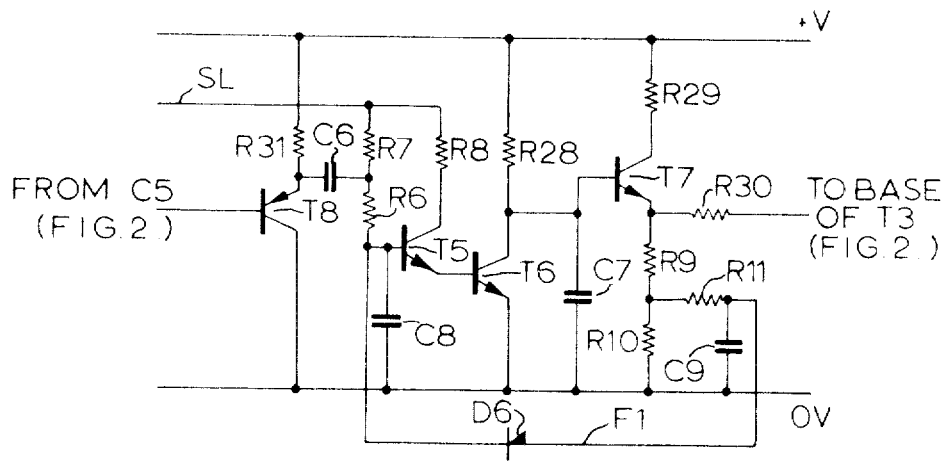

The signal processing circuit of FIG. 4 is also responsive to produce its output when the deceleration of the wheel exceeds a predetermined value, and this circuit terminates its output when the speed signal voltage applied to its assumes a value signifying that the wheel deceleration no longer exceeds said predetermined value. This circuit comprises transistors T5, T6 and T7, resistors R6, R7 and R8 which afford the same circuit operations as the correspondingly referenced components in the circuit of FIG. 3 described above. Additionally, the circuit of FIG. 4 comprises an emitter follower transistor T8 in which the speed signal voltage produced across capacitor C5 (FIG. 2) is applied to the input side of capacitor C6 via this emitter follower transistor T8. The circuit of FIG. 4 further comprises a feedback path F1 which provides, via a diode D6, a feedback voltage from the emitter of transistor T7 to the base of transistor T5. The magnitude of this feedback voltage is determined by the values of resistors R9 and R10 which form a potential divider in the emitter circuit of transistor T7. A delay element comprised by a resistor R11 and a capacitor C9 provides a time delay the duration of which is determined by the time constant afforded by the values of these latter two components. This delay element delays the application of the feedback voltage to the base of transistor T5. The effect of this feedback voltage is to over-ride the predetermined reference value of wheel deceleration afforded by capacitor C6 and resistors R6 and R7 in a sense that tends to render transistor T5 conductive again. Irrespective of the value of the speed signal voltage that obtains when the feedback voltage is produced, the transistor T5 (and transistor T6) will be rendered partially conductive by the feedback voltage so that when the wheel deceleration no longer exceeds said predetermined value transistors T5 and T6 become fully conducting again to cause the output from the circuit to be terminated by rendering transistor T7 non-conductive. Due to the partially conductive condition of transistors T5 and T6 when the feedback path F1 is operational, any ripple on the speed signal voltage is liable to cause transistor T7 to be turned on and off at the ripple frequency, with the result that the energization of the solenoid S would be delayed if the feedback path F1 were operational at the beginning of an anti-lock period. It is for this reason that the operation of the feedback path F1 is delayed for a short time by resistor R11 and capacitor C9. However, the ripple affords rapid de-energization of the solenoid S at the end of the anti-lock period due to the solenoid current being modulated between holding and drop-out values by the on/off conduction of transistor T7 due to the ripple.

The emitter follower transistor T8 in the circuit of FIG. 4 provides a low impedance input to the base of transistor T5, this being necessary due to the connection of the feedback path F1 to this base.

The waveform diagram in FIG. 11(b) is illustrative of the operation of the signal processing circuit of FIG. 4. This diagram differs from FIG. 11(a) in that the anti-lock period is now the period $t1$ (or $t2$) to $t6$, $t6$ being the time when the wheel deceleration no longer exceeds the predetermined value (as given by the slope of line $Re$ or $Re'$).

Figure 5:
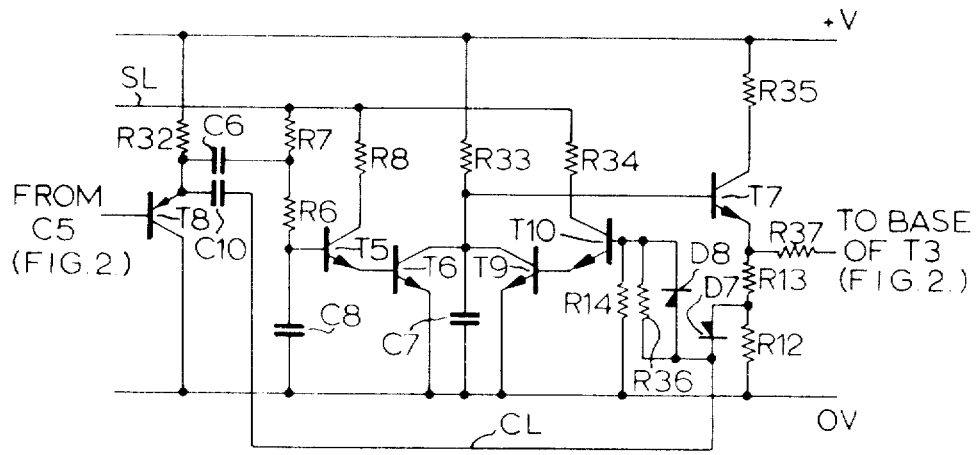

The signal processing circuit of FIG. 5 is also responsive to produce an output when the deceleration of the wheel exceeds a predetermined value. This circuit terminates its output either when the speed signal voltage applied to it assumes a value signifying that the wheel has reached the speed it would have achieved if it had continued to decelerate at said predetermined value from the speed it was doing when the circuit was rendered responsive, or when the wheel exceeds a predetermined acceleration following response of the circuit, whichever condition obtains first. This circuit comprises transistors T5, T6, T7 and T8, resistors R6, R7 and R8 and capacitors C6, C7 and C8 which afford the same circuit operations as the correspondingly reference components in the circuit of FIG. 4 described above. Additionally, the circuit of FIG. 5 comprises two further transistors T9 and T10 which are connected in parallel with transistors T5 and T6. The operation of the circuit of FIG. 5 in rendering transistor T7 conductive to produce an output is the same as that already described for the circuits of FIGS. 3 and 4. During this operation transistors T9 and T10 remain non-conductive. When transistor T7 is rendered conductive, the potential rises at the junction of two resistors R12 and R13 which form a potential divider in the emitter circuit of this transistor. This potential is effective through a diode D7 to cause transistors T10 and T9 to become partially conductive but not sufficiently so to render transistor T7 non-conductive. Thus, at this time either transistor T5 or transistor T10 can be rendered fully conductive to render transistor T7 non-conductive and thereby terminate the output from the circuit. If the speed/voltage at the emitter of transistor T8 assumes a value signifying that the wheel has reached the speed it would have been doing if it had continued to decelerate at said predetermined value from the speed it was doing when the circuit was rendered responsive, then transistor T5 will be rendered conductive again as already described for the circuit of FIG. 3. On the other hand, if the wheel acceleration exceeds a predetermined value before this happens then the speed signal voltage at the emitter of transistor T8, which is applied through a capacitor C10, over a connection CL and through a diode D8 to the base of transistor T10, will have increased sufficiently in value to render this transistor fully conductive to terminate the output from the circuit. The diode D7 ensures that the feedback from the junction of resistors R12 and R13 is only effective for wheel deceleration.

The value of a resistor R14 connected between the base of transistor T10 and the supply voltage line OV determines the rate of acceleration which has to occur before transistor T10 is rendered fully conductive. Without this resistor R14, transistor T10 would be rendered fully conductive substantially at the start of wheel acceleration.

The waveform diagram in FIG. 11(c) is illustrative of the operation of the circuit of FIG. 5. The anti-lock period can be either the period $t1$ (or $t2$) to $t4$ (or $t5$), or $t1$ (or $t2$) to $t7$, $t7$ being the time when the predetermined rate of acceleration, as represented by the slope of line A$e$, is reached. Time t8 is a time substantially at the start of acceleration when the transistor T10 would be rendered fully conductive if resistor R14 were omitted from the circuit, in which case an anti-lock period would be from $t1$ (or $t2$) to $t8$.

Figure 6:
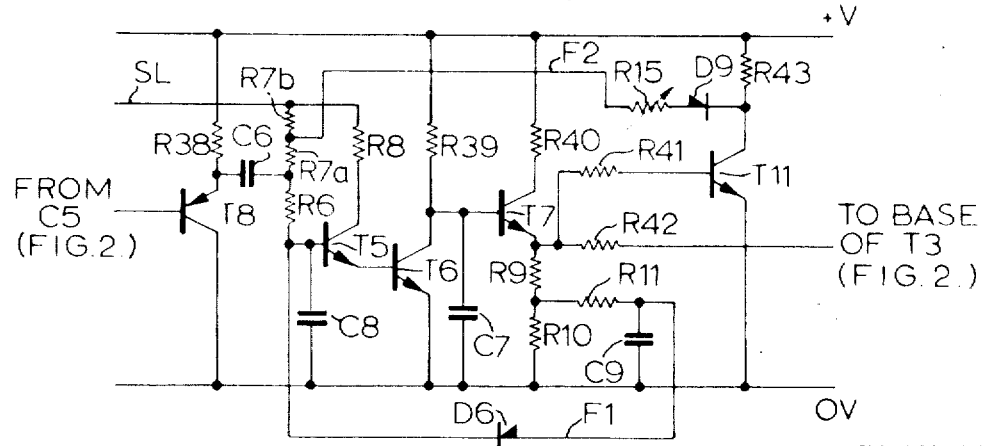

The signal processing circuit of FIG. 6 is also responsive to produce its output when the deceleration of the wheel exceeds a predetermined value and this circuit terminates its output when the wheel deceleration no longer exceeds a further predetermined value or the wheel has ceased to decelerate following an anti-lock action. This circuit comprises the same components as the circuit of FIG. 4 and, additionally, a second feedback path F2 and a further transistor T11. The circuit of FIG. 6 operates in the same way as the circuit of FIG. 4 to produce its output at the emitter of transistor T7 and to provide at the base of transistor T5 a feedback voltage to render this latter transistor partially conductive again. The second feedback path F2 provides, via a diode D9 and a variable resistor R15, a feedback voltage which is, in effect, a new reference voltage in the base circuit of transistor T5. This feedback voltage is applied at the junction of two resistors R7a and R7b (which replace the resistor R7 in FIG. 4) and is produced when transistor T11 is rendered conductive, following conduction of transistor T7. Resistor R15 is variable to select a value of feedback voltage which provides a new reference voltage such that transistor T5 is rendered fully conductive in response to the value of speed signal voltage applied across capacitor C6 when deceleration of the wheel ceases or when wheel deceleration no longer exceeds a further predetermined value, or when the wheel has accelerated to a predetermined rate as selected by the setting of resistor R15.

The waveform diagram in FIG. 11(c) is illustrative of the operation of the signal processing circuit of FIG. 6. This diagram differs from FIG. 11(a) in that the anti-lock period is now the period $t1$ (or $t2$) to $t9$, $t9$ being the time when the wheel deceleration ceases, or the period t1 (or $t2$) to $t10$, $t10$ being the time when wheel deceleration no longer exceeds a further predetermined value. The anti-lock period can also be $t1$ (or $t2$) to $t11$, $t11$ being the time when the wheel has accelerated to said predetermined rate.

Each of the signal processing circuits shown in FIGS. 4, 5 and 6 can include any one of the subsidiary circuits of FIG. 7 to 10 which provide respective ones of the subsidiary criteria ($a$) to ($d$) referred to previously. Each of these circuits is adopted for connection, as indicated, between capacitor C5 (FIG. 2) and the base of transistor T3 (FIG. 2) in parallel with the particular signal processing circuit in which it is included.

Figure 7:
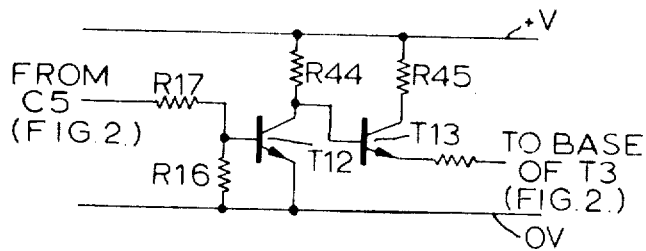
FIGS. 7 to 10 show respective circuits for providing inhibiting conditions for each of the signal processing circuits of FIGS. 4 to 6.

The circuit of FIG. 7 comprises two transistors T12 and T13 of which the transistor T12 has its base connected to the junction of two resistors R16 and R17 which form potential divider and have values so chosen as to determine from the speed signal voltage from capacitor C5 a wheel reference speed which has to obtain before the transistor T3 (FIG. 2) can be rendered non-conductive due to termination of the output from the emitter of transistor T7 in the signal processing circuit concerned. To achieve this, transistor T12 is normally non-conductive during an anti-lock period to hold transistor T13 conductive so that its emitter potential clamps the base of transistor T3 to prevent the latter becoming non-conductive, notwithstanding that the transistors T5 and T6 in the signal processing circuit may have been rendered conductive again. When the predetermined wheel reference speed is exceeded the potential at the junction of resistors R16 and R17 becomes sufficiently positive to render transistor T12 conductive, thereby rendering transistor T13 non-conductive so as to remove the clamp from the base of transistor T3 to allow the latter to become non-conductive.

Figure 8:
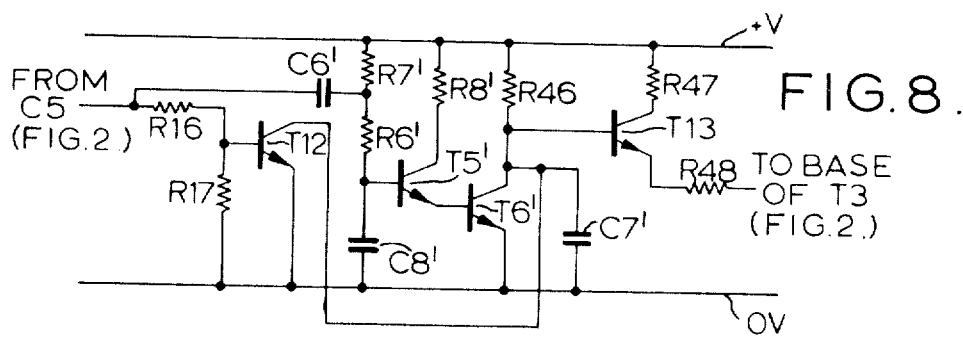

The circuit of FIG. 8 also comprises the two transistors T12 and T13 and resistors R16 and R17 which function in the same way as the corresponding components in FIG. 7 to clamp the base of transistor T3 (FIG. 2) to prevent non-conduction of this transistor unless a predetermined wheel reference speed is exceeded. Additionally, the circuit of FIG. 8 comprises two further transistors T5' and T6' with associated components C6', C7', C8', R6', R7' and R8'. Comparison with FIG. 3 will show that these two transistors and associated components form the same circuit as the circuit of FIG. 3, and this circuit holds transistor T13 conductive to hold transistor T3 conductive (transistors T5' and T6' being non-conductive during an anti-lock period) until the speed signal voltage from capacitor C5 assumes a value signifying that the wheel is not below the speed it would have been doing if it had continued to decelerate at the predetermined value from the time when an associated signal processing circuit was rendered responsive.

Figure 9:
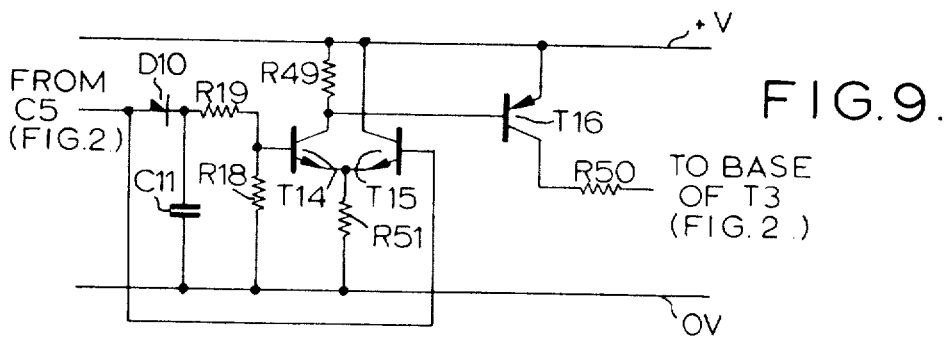

The circuit of FIG. 9 comprises three transistors T14, T15 and T16 of which transistor T15 is non-conductive and transistors T14 and T16 are conductive during an anti-lock period. Conduction of transistor T16 clamps the base of transistor T3 to prevent non-conduction of this latter transistor. Resistors R18 and R19 determine a chosen fraction of wheel speed that a wheel would have been doing if it had continued to decelerate at the predetermined value from the time when an associated signal processing circuit was rendered responsive. When the speed signal voltage applied from capacitor C5 (FIG. 2) assumes a value signifying that this chosen fraction of wheel speed has been exceeded, the voltage applied to the base of transistor T15 exceeds that applied to the base of transistor T14 from the junction of resistors R18 and R19 so that transistor T15 is rendered conductive and transistor T14 non-conductive. In turn, transistor T16 is rendered non-conductive to remove the clamp from the base of transistor T3 (FIG. 2).

Figure 10:
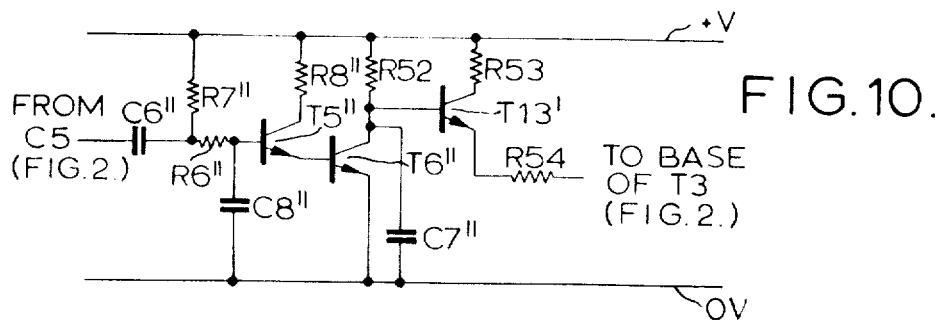

The circuit of FIG. 10 corresponds to the circuit of FIG. 3 with regard to its components C6'', C7'' and C8'', R6'', R7'' and R8'', and transistors T5'' and T6''. This circuit drives a transistor T13' such that this transistor is rendered conductive by the circuit to hold transistor T3 (FIG. 2) conductive until the speed signal voltage from capacitor C5 assumes a value signifying that the wheel is not a fixed amount below the speed it would have been doing if it had continued to decelerate at the predetermined value from the time when an associated signal processing circuit was rendered responsive, this fixed amount being determined by the value of resistor R6''.

Assuming that the pick-up 1 (FIG. 1) is adapted to produce electrical pulses from ferromagnetic toothed ring having sixty teeth evenly distributed about its circumference and that the ring is rotatable with a vehicle wheel of approximately two feet in diameter, then suitable components and component values for the circuits of FIGS. 1 to 10 are as follows:

Transistors
T1 - BC108 (Mullard)
T2 - BC108 (Mullard)
T3 - BFY 52 (Mulllard)
T4 - BDY 10 (Mullard)
T5, T5', T5'' - BC 109 (Mullard
T6, T6', T6'' - BC 109 (Mullard)
T7 - BC 109 (Mullard)
T8 - BCY 32 (Mullard)
T9 - BC 109 (Mullard)
T10 - BC 109 (Mullard)
T11 - BC 109 (Mullard)
T23 - BC 109 (Mullard)
T13, T13' - BC 109 (Mullard)
T14 - BC 109 (Mullard)
T15 - BC 109 (Mullard)
T16 - BCY 32 (Mullard)

Resistors
R1 - 1MΩ
R2 - 3KΩ
R3 - 150Ω
R4 - 15KΩ
R5 - 150KΩ
R6, R6' - 33KΩ
R6'' - as selected
R7a, R7, R7', R7'' - 1MΩ
R7b - 10KΩ
R8', R8'', R8 - 1MΩ
R9 - 10KΩ
R10 - 4KΩ
R11 - 12KΩ
R12 - 22KΩ
R13 - 47KΩ
R14 - as selected
R15 - 10kΩ
R16 - as selected
R17 - as selected
R18 - as selected as selected
R19
R20 - 18KΩ
R21 - 56KΩ
R22 - 1KΩ
R23 - 1KΩ
R24 - 33KΩ
R25 - 150Ω
R26 - 10KΩ

R27 - 47Ω
R28 - 33KΩ
R29 - 150Ω
R30 - 470Ω
R31 - 150KΩ
R32 - 82KΩ
R33 - 33KΩ
R34 - 1MΩ
R35 - 150Ω
R36 - 470KΩ
R37 - 330Ω
R38 - 150KΩ
R39 - 33KΩ
R40 - 150 Ω
R41 - 10KΩ
R42 - 470 Ω
R43 - 10KΩ
R44 - 3KΩ
R45 - 150 Ω
R46 - 33KΩ
R47 - 150 Ω
R48 - 470 Ω
R49 -
R50 - 470
R51 -
R52 - 33KΩ
R53 - 150 Ω
R54 - 470 Ω

Capacitors
C2 - 0.22μF
C2 - 0.1μF
C3 - 0.022μF
C4 - 0.1μF
C5 - 1.0μF
C6, C6', C6'' - 1.0μF
C7, C7', C7'' - 2kpF
C8, C8', C8'' - 0.1μF
C9 - 1μF
C10 - 1μF
C11 -

Diodes
D1 - 0A202 (Mullard)
D2 - 0A202 (Mullard)
D3 - 8.2v Zener (Mullard)
D4 - 0A202 (Mullard)
D5 - BYZ10 (Mullard)
D6 - 0A202 (Mullard)
D7 - 0A202 (Mullard
D8 - 0A202 (Mullard)
D9 - 0A202 (Mullard)
D10 0A202 (Mullard)

Voltages
+V = 12 volts.

Instead of using discrete components for the circuits of FIGS. to 10, these circuits may be formed as integrated circuits, for example, as thin film integrated circuits mounted with transistor chips.

FIG. 12 shows diagrammatically a general layout for an anti-lock brake system in which the present invention can be embodied. This layout shows a brake foot pedal FP which actuates the piston of a master cylinder MC. The latter actuates (directly or via a servo) a wheel brake WB for a vehicle wheel W via anti-lock control unit CU. A sensor SE, which can be the pick-up 1 of the anti-lock circuit arrangement of FIG. 1, applies electrical pulses related to wheel speed to a processing circuit PC which would be formed by the elements 2,3,4 and 5 of the anti-lock circuit arrangement of FIG. 1. The anti-lock control unit CU would include the solenoid 6 of the arrangement of FIG. 1, and solenoid energization for a period, as brought about by the circuit PC as hereinbefore described, causes the unit CU to effect an anti-lock action to relieve braking pressure applied to wheel W during such period.

The anti-lock control unit CU can be of any of the forms described in co-pending U.S. application Ser. No. 881,460, filed Dec. 2, 1969 now abandoned.

What we claim is:

1. A signal processing circuit comprising differentiating means for differentiating an applied electrical quantity which is a function of wheel rotational speed to produce a signal waveform which is a function of wheel deceleration, the signal processing circuit being responsive to produce an output signal when an instantaneous value of this signal waveform exceeds a reference value, determined by certain of the circuit parameter, said differentiating means comprising a first capacitor having an input side connected to a point of application in the circuit of an input voltage which is a function of wheel rotational speed an an output side connected to a base of a first, normally conductive, transistor, and a first resistor connected between said base and a voltage line, and also between the voltage line and said capacitor, the values of said first capacitor and first resistor determining said reference value and the arrangement being such that said first transistor is normally conductive due to the current flow in its base via said first resistor from the voltage line and that as the value of said input voltage at the input side of said first capacitor changes, due to increase in wheel deceleration, current through said first resistor is diverted from the base of said first transistor to the output side of said first capacitor until, when said reference value has been exceeded, so much of the current has been diverted that said first transistor is rendered nonconductive to cause a second, normally nonconductive, transistor to be rendered conductive to provide an output signal from the circuit at an output connection thereof.

2. The signal processing circuit of claim 1, wherein said processing circuit is arranged not to respond when said instantaneous value of the signal waveform exceeds said reference value until such value persists for longer than a predetermined period or varies in a sense denoting increasing deceleration over such period.

3. The signal processing circuit as claimed in claim 1, wherein said first transistor has its emitter connected to a base of a third transistor which is also normally conductive and is rendered nonconductive when said first transistor is rendered nonconductive, said second transistor having its base connected to a collector of said third transistor and being rendered conductive when the latter is rendered nonconductive.

4. The signal processing circuit as claimed in claim 3, wherein said second transistor is connected as an emitter follower transistor so as to provide the output signal from the circuit at its emitter.

5. The signal processing circuit as claimed in claim 3, wherein current through said first resistor is normally about 10 times the current needed to maintain said first and third transistors conductive, so that the predetermined value of wheel deceleration at which said second transistor becomes conductive is virtually independent of the gains of said first and third transistors.

6. The signal processing circuit as claimed in claim 1, further comprising a second resistor feeding the base of said first transistor, the value of said second resistor being so chosen that the voltage drop across it due to the current flow through it into the base of said first transistor determines a fixed amount of decrease in wheel speed by more than which a wheel is required to decrease its speed at a rate in excess of said predetermined value of wheel deceleration before said first transistor is rendered nonconductive.

7. The signal processing circuit as claimed in claim 1, wherein said voltage line is a stabilized voltage line.

8. The signal processing circuit as claimed in claim 1, wherein said first transistor is rendered conductive, after being rendered nonconductive, when the input voltage at the input side of said first capacitor next assumes the value indicative of said predetermined value of wheel deceleration whereby the output signal from the circuit is terminated when a second criterion is satisfied.

9. the signal processing circuit as claimed in claim 1, further comprising additional transistor means connected in parallel with said first transistor, said additional transistor means being normally nonconductive and being rendered partially conductive when said second transistor is rendered conductive, but not sufficiently so to render said second transistor nonconductive, the arrangement being such that said additional transistor means is rendered fully conductive to render said second transistor nonconductive when the input voltage at the input side of said first capacitor next assumes a value indicative of the start of wheel acceleration, or has exceeded a predetermined value, whereby the output signal from the circuit is terminated when a wheel starts to accelerate or exceeds a predetermined acceleration following initiation of an anti-lock action.

10. The signal processing circuit as claimed in claim 9, further comprising a potential divider connected in the emitter circuit of said second transistor to provide a bias current causing said transistor means to become partially conductive when said second transistor is rendered conductive, and a connection, including a capacitor, between the input side of said first capacitor and a base circuit of said additional transistor means, the latter being rendered fully conductive to render said second transistor nonconductive in response to the application to its base via said connection of input voltage, of a value indicative that wheel acceleration has started.

11. the signal processing circuit as claimed in claim 10, further comprising a bias resistor connected in the base circuit of said additional transistor means and modifying the response thereof, inaccordance with its value, such that said additional transistor means is rendered fully conductive to a value of input voltage indicative of a predetermined acceleration.

12. The signal processing circuit as claimed in claim 9, further comprising an emitter follower transistor through which said input voltage is applied to the input side of said first capacitor.

* * * * *